(12) United States Patent  
Kulkarni (10) Patent No.: US 9,367,244 B2  
(45) Date of Patent: Jun. 14, 2016

(54) COMPOSING A VIRTUAL DISK USING APPLICATION DELTA DISK IMAGES

(71) Applicant: VMware, Inc., Palo Alto, CA (US)

(72) Inventor: Neeraj Sanjeev Kulkarni, Pune (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/557,137

(22) Filed: Dec. 1, 2014

(65) Prior Publication Data

US 2015/0089172 A1 Mar. 26, 2015

Related U.S. Application Data

(63) Continuation of application No. 13/467,004, filed on May 8, 2012, now Pat. No. 8,904,081.

(51) Int. Cl.
| | |
|---|---|
| *G06F 12/00* | (2006.01) |
| *G06F 13/00* | (2006.01) |
| *G06F 3/06* | (2006.01) |
| *G06F 9/455* | (2006.01) |
| *G06F 9/44* | (2006.01) |

(52) U.S. Cl.  
CPC .............. *G06F 3/0608* (2013.01); *G06F 3/065* (2013.01); *G06F 3/067* (2013.01); *G06F 3/0664* (2013.01); *G06F 9/4445* (2013.01); *G06F 9/45554* (2013.01); *G06F 9/45558* (2013.01); *G06F 2009/45575* (2013.01)

(58) Field of Classification Search  
None  
See application file for complete search history.

(56) References Cited

U.S. PATENT DOCUMENTS

| | | | |
|---|---|---|---|
| 8,386,707 | B2 | 2/2013 | Noguchi et al. |
| 8,386,757 | B1 | 2/2013 | Midgley et al. |
| 8,473,731 | B2 | 6/2013 | Bogner et al. |
| 9,053,107 | B1 * | 6/2015 | Le |
| 2009/0271787 | A1 | 10/2009 | Clark |
| 2009/0292737 | A1 * | 11/2009 | Hayton .......................... 707/200 |
| 2012/0179778 | A1 * | 7/2012 | DeSwardt et al. ............ 709/217 |
| 2012/0233434 | A1 | 9/2012 | Starks et al. |
| 2012/0297181 | A1 * | 11/2012 | Lee .................................. 713/2 |

* cited by examiner

*Primary Examiner* — Sean D Rossiter  
(74) *Attorney, Agent, or Firm* — Patterson & Sheridan LLP (57) ABSTRACT

According to a system and method for composing a virtual disk for a virtual desktop, the virtual desktop is booted from a virtual disk comprised of a base disk image and a user delta disk image that receives all disk writes to the virtual disk. Disk space is allocated on the virtual disk for a file associated with a selected application to be provided to a user of the virtual desktop. Then the virtual desktop is recomposed offline by linking the base disk image, an application delta disk image including the file associated with the selected application, and the user delta disk image. The recomposing includes modifying meta data of the application delta disk and the user delta disk so that the file associated with the selected application is mapped to the disk space previously allocated.

17 Claims, 8 Drawing Sheets

COMPOSING A VIRTUAL DISK USING APPLICATION DELTA DISK IMAGES

CROSS-REFERENCE TO RELATED APPLICATIONS

This application is a continuation of, and claims the benefit of, U.S. patent application Ser. No. 13/467,004, filed May 8, 2012, entitled "Composing a Virtual Disk Using Application Delta Disk Images," which will issue as U.S. Pat. No. 8,904,081 or Dec. 2, 2014.

BACKGROUND

Computer virtualization is a technique that involves abstracting a physical computing machine platform into a virtual machine that is executed under the control of virtualization software running on a single hardware computing platform (also referred to herein as a "host system" or a "host computer"). A group of hardware computing platforms may be organized as a cluster to provide the hardware resources for virtual machines. In a server or data center that employs virtual machines, it is common to see hundreds, even thousands, of virtual machines running on multiple clusters of host systems.

For ease of deployment, software management and hardware cost reduction reasons, virtual machines have been used to support virtual desktops for use in an organization in place of physical workstations. In such environments, a virtual desktop includes a virtual disk that refers to one or more "delta disk images" layered on top of a master image, or "base disk image." By "layered" it is meant that modifications to the master image, which is configured to be read-only, are written to one or more of the delta disks. In a virtual desktop infrastructure (VDI), the operating system is typically encapsulated in the master image. The same master image is used in generating all virtual desktops. User-specific applications and settings are installed in the one or more delta disks that are layered on top of the master image.

However, this approach has some limitations. First, if the master image is updated with patches, the delta disk images layered on top of the patched master image would not function properly since the delta disk images are dependent on the master image. Accordingly, new delta disk images would need to be created for each VM each time the master image is updated. Second, when many applications and settings are incorporated into the delta disks, the size of the delta disk images may become quite large. Managing large delta disk images can be time-consuming and cumbersome for an administrator.

SUMMARY

Described herein is a technique for dynamically composing a virtual desktop that provides a user access to a selected application or applications is a virtualized computing environment. In some embodiments, the operating system is stored in the base disk image and one or more applications for the virtual desktop are stored in application containers that are encapsulated in separate virtual disk images. The virtual disk images that include the encapsulated application containers are linked to the base virtual disk in a disk chain. Disk space may be allocated on the virtual disk for a file associated with the selected application to be provided to a user of the virtual desktop. Then the virtual desktop is recomposed offline by linking the base disk image, an application delta disk image including the file associated with the selected application, and the user delta disk image. The recomposing includes modifying meta data of the application delta disk and the user delta disk so that the file associated with the selected application is mapped to the disk space previously allocated.

DETAILED DESCRIPTION

Figure 1A:
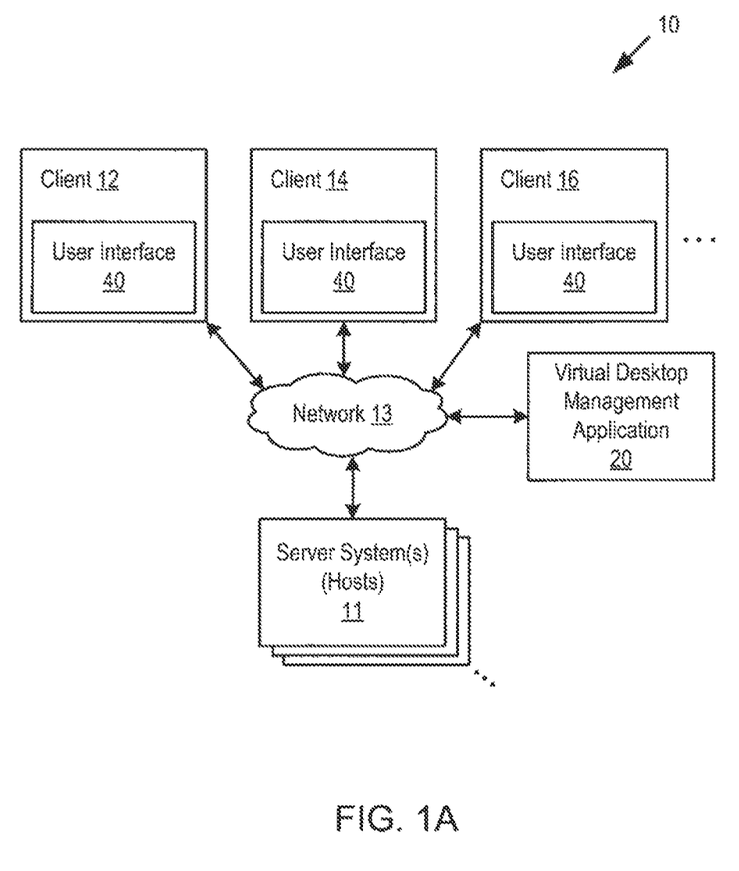
FIG. 1A illustrates a virtual desktop infrastructure (VDI) system in which one or more embodiments may be practiced.

FIG. 1A illustrates a virtual desktop infrastructure (VDI) system 10. The term, "desktop" refers to a human interlace environment through which users can launch, interact with, and manage the user's applications, settings, and data. Traditionally, a desktop is presented by an operating system on a video display, and a user interacts with the desktop using a mouse and keyboard. Applications, documents, and other files may be displayed on the desktop and user input can be received by applications visible to the user on the display. The term "desktop" is also known to be used to refer to a physical computer system or "physical desktop" that might be placed on or near a user's desk, which is distinct from a "laptop" or "palmtop," but as used herein, the term "desktop" by itself refers to the human interface environment described above, and not a physical computer system. Using computer visualization, a user's computer system, including operating system settings, applications and application settings, and data may be transferred or copied as a virtual machine from one physical computer to another. When a virtual machine is copied in this way, the user can access his or her "desktop" from the physical computer system containing the original virtual machine, or the physical computer system containing the copy. The "desktop," therefore, is no longer tied to a particular physical computer system.

VDI system 10 includes VDI server systems (also referred to as "hosts") 11 in data communication over network 13 with any number of VDI client systems 12, 14, and 16. Network 13 may be any configuration, such as a local area network (LAN), or private or publicly accessible wide area network (WAN), such as the Internet. It should be recognized that FIG. 1A shows a simplified representation of a typical VDI system 10, which may include other components such as firewalls, connection brokers, and load balancers, as well as back-end storage networks, database servers, among others. Each client system 12, 14, 16 may include a user interface 40 through which a user can interact with his or her virtual desktop. VDI system 10 also includes a virtual desktop management application 20 that generates virtual desktops, as described in greater detail below. Virtual desktop management application 20 may reside outside of any virtual desktop instances and may reside on a separate physical machine (not shown) such as a central management server, which is in communication with hosts 11, e.g., via network 13 or a different network (not shown).

Figure 1B:
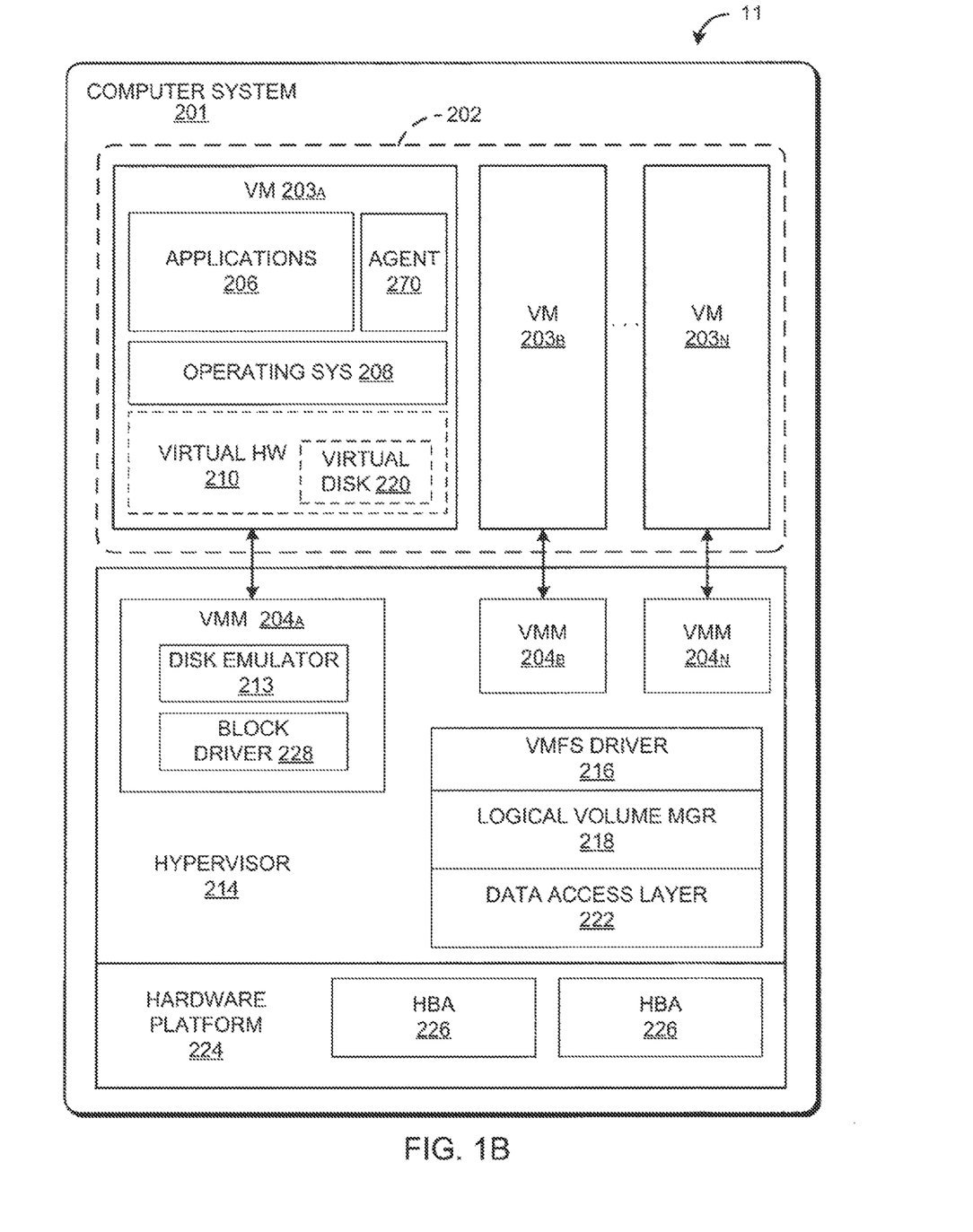
FIG. 1B is a block diagram illustrating a virtualized computer system in which one or more embodiments can be practiced.

FIG. 1B is a block diagram illustrating by way of example an embodiment of server system 11. Server system 11 includes an integral computer system 201 constructed on a conventional, typically server-class hardware platform 224, including host bus adapters (HBAs) 226 in addition to a conventional platform processor, memory, and other standard peripheral components (not separately shown). Hardware platform 224 executes a hypervisor 214 supporting a virtual machine execution space 202 within which virtual machines (VMs) $203_{A-N}$ are executed. In one or more embodiments, hypervisor 214 and virtual machines $203_{A-N}$ are implemented using the vSphere® product developed and distributed by VMware, Inc.

Hypervisor 214 provides services and support to enable concurrent execution of virtual machines $203_{A-N}$. In turn, each virtual machine $203_{A-N}$ Implements a virtual hardware platform 210 emulated by a corresponding one of virtual machine monitors (VMMs) $204_{A-N}$, but presented in FIG. 1B as a conceptual layer that supports the execution of a guest operating system 208 and one or more client applications 206 (which may be encapsulated in "application containers," as further discussed below). In one or more embodiments, the guest operating systems 208 are instances of Microsoft Windows®, Linux®, or the like. Other guest operating systems can be equivalently used. In each instance, guest operating system 208 includes a native file system layer, typically either an NTFS (New Technology File System) or an ext3 (third extended) file system file system layer. These file system layers interface with the virtual hardware platforms 210 to access, from the perspective of guest operating systems 208, a data storage device. In one implementation, virtual hardware platform 210 includes a local virtual disk 220 that emulates the necessary system hardware support to enable execution of the guest operating system 208 transparently to the visualization of the system hardware. In a paravirtualization system, which is also contemplated, the operating system may interact with virtual or physical system hardware components with varying degrees of transparency.

File system calls initiated by guest operating system 208 to perform file system-related data transfer and control operations on virtual disk 220 are processed using a native disk I/O driver that accesses virtual disk 220 via a virtual PCI interface (not shown). VMM 204 receives disk I/O block requests and translates them into file-level accesses on a network datastore as described in more detail below.

Block driver 228 assists VMM $204_A$ in determining a storage location of data requested by the file system calls from guest operating system 208. For example, upon receiving a the system block level request to read or write data to virtual disk 220, disk emulator 213 may request block driver 228 to map the data in virtual disk 220 to a corresponding disk image file or files maintained on a network datastore. As described below, virtual disk 220 may be stored in a one or more files forming a base disk image and one or more files corresponding to one or more delta disk images, that are layered on the base disk image. In one embodiment, the disk image files for virtual disk 220 are implemented using the VMDK (Virtual Machine Disk Format) file format developed by VMware, Inc., although other formats may be similarly implemented.

For example, guest operating systems 208 can receive file system calls and perform corresponding command and data transfer operations against virtual disks, such as virtual SCSI (Small Computer System Interface) devices, that are visible to the guest operating system (OS) 208 (e.g., as a virtual disk 220, etc.). These virtual disks 220 are backed with one or more files stored on a storage system (not shown) networked to server system 11. Guest operating system 208 file system calls are translated from virtual disk 220 access requests made by guest OS 208 to file access requests, where the files collectively represent a disk image for virtual disk 220. Such translations are performed by hypervisor 214 by disk emulator 213 and block driver 228, as well as VMFS driver 216, a logical volume manager 218, which assists VMFS driver 216 with mapping files stored in the VMFS file system with the storage system exposed by the storage system manager, a data access layer 222, including device drivers, and host bus adapters 226 (which, for example, issue a SCSI command to the storage system manager to access storage system). Although the present example represents file management using a VMFS file system, other file systems may instead be used.

It should be recognized that the various terms, layers, and categorizations used to describe the virtualization components in FIG. 1B may be referred to differently without departing from their functionality. For example, while block driver 228 has been depicted as part, of VMM $204_A$, it should be recognized that alternative embodiments may implement block driver 228 as part of a different component of hypervisor 214. Similarly, it should be recognized that VMMs $204_{A-N}$ may be considered separate virtualization components between VMs $203_{A-N}$ and hypervisor 214 (which, in such an embodiment, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative embodiment, for example, the conceptual layer described as virtual hardware platform 210 may be merged with and into VMMs $204_{A-N}$.

Embodiments are described herein of a technique to compose virtual desktops having one or more applications in a virtualized computing environment, yet retain the ability to apply changes to each application independent of the other applications or operating system. The embodiments solve the efficiency issues of current VDI adoption techniques, for example, by populating metadata of a guest file system, making new file entries, allocating blocks for the new files, but not actually copying any of the file data Into the allocated blocks. Instead, the data associated with the applications are stored in application containers that are implemented as delta disk images (e.g., formed from VMDK files having a ".vmdk" file extension of suffix) layered on top of a base virtual disk image, also formed from VMDK-formatted files.

Applications 206 that are to be delivered to the virtual desktop may be encapsulated in application containers, also referred to as "virtualized applications." In one embodiment, an application container is a data structure that contains files and settings of the application in an OS-neutral format. In other embodiments, the application is OS-dependent. An OS-neutral, application container is one that may include file system and registry entries with macros within the container that are expanded depending on the type of operating system. In contrast, an OS-dependent application container may work with only the designated operating system. An application container may be a single file containing all files and settings associated with a particular application installation, along with meta information about the settings and files. In some embodiments, the ThinApp™ program provided by VMware, Inc. can be used to generate virtualized applications.

In one implementation for generating such application containers, a standard operating system is scanned as a reference point. The scanning process scans the system registry and the file system to generate a list of all the files and settings that are present in the computer system. Then, the application to be captured into the application container is installed onto the computer system. The installation writes files to the disk and updates the operating system's registry. Once the application is completely installed, a post-installation scan of the computer system may be performed and a second list is generated that includes the new additions or changes to the computer system caused by the installation. Differences in the files and registry (and any other changes) between the pre-installation scan list and the post-installation scan list are identified. The resulting files and registry entries may then be stored in an application container that may further contain a runtime component. The application container, which may exist as a single file, may be stored, for example, on a virtual disk of a user's virtual desktop, and serve as the executable file for the application.

When the user launches the runtime engine or component associated with the application container (e.g., from the file system of the guest OS of the virtual desktop), the runtime component executes the code of the application itself (which is embedded in the application container) and intercepts and redirects any requests by the application code to access registry settings and/or files to those within the application container itself, to the extent that the accessed registry values and/or files are stored in the application container, as previously discussed. Because applications captured in application containers are self-contained, they can be updated (e.g., replaced with a new version of the application, etc.) in a virtual desktop image without interfering with other components of the virtual desktop, enabling such application containers in the virtual desktop to be updated more efficiently, as described in greater detail herein. It should be recognized however, that although embodiments herein utilize and refer to such application containers, alternative embodiments may utilize traditional applications rather than such application containers. In addition, the runtime component is not required for the layering, only for redirecting I/O accesses by the application to the "sandbox" provided by the vitalized application container file, which to guest operating system, exists as a single file in a unified disk image.

In one embodiment, the application, which may be packaged into an application container file, is encapsulated and stored in a virtual disk image file according to a virtual disk image file format, such as the VMDK file format. The virtual disk image file that includes the application can be layered on a base virtual disk image that includes, for example, a "vanilla" operating system that does not have any applications installed thereon. As described in further detail below, simply composing a virtual disk image incorporating both a base disk image and a delta disk that encapsulates the application, can virtually instantly create a virtual disk image with application installed—only minimal copying or moving of configuration data from one place to another on the datastore is required to completely create the composed virtual disk image.

Figure 2A:
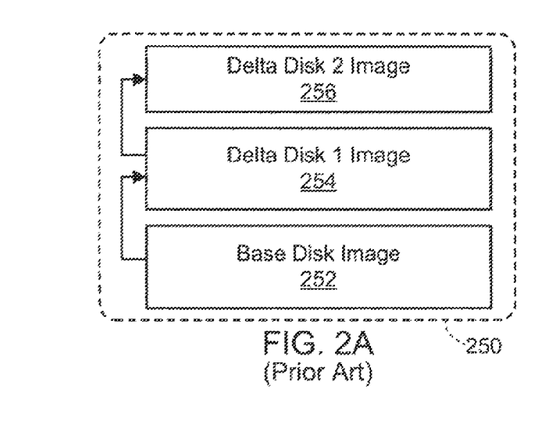
FIG. 2A is a conceptual diagram illustrating linking of delta virtual disk images as generally understood in the art.

The use of delta disks to manage snapshot images of virtual disks is well known. FIG. 2A is a conceptual diagram illustrating die known technique of linking delta disks created when taking snapshots of the virtual disk image state to create disk image 250 which may provide a representation of the contents of virtual disk 220 in FIG. 1B. The term, "disk image" is used extensively herein to refer to one or more files that represent a complete disk image. A "delta disk image" is one or more files that, when combined with at least a base disk image, represents a complete disk image. The complete disk image contains all the data necessary to present to guest OS 203 a virtual disk. Disk images may be implemented in the VMDK file format defined by VMware, Inc. Each delta disk image 254, 256 contains a "redo log" or changes to the underlying base disk image 252 or delta disk image 254, respectively. As mentioned, delta disk images are known as a means to implement snapshots, which captures a state of the virtual disk at a particular point in time, such as a restore point. Initially, for example, virtual disk 220 may be hacked by only base disk image 252. Base disk image 252 contains a complete disk image and exists as one or more files (e.g., VMDK files) that reside on a network datastore (not shown).

If a snapshot is taken of the virtual machine that is associated with base disk image 252, base disk 252 is locked against further write access, and all changes to disk image 250 are written to delta disk 1 image 254 so that the "current" disk image 250 associated with virtual disk 220 includes both base disk image 252 and delta disk 1 image 254. At this time, base disk image 252 includes a complete virtual disk image at the time the snapshot was takes, and base disk image 252 plus delta disk 1 file 254 together form a current virtual disk image. Reads are directed to delta disk 1 image 254, and if the requested data is not present in delta disk 1 image 254, e.g., because the data at the requested read location has not been modified since the snapshot was taken, base virtual disk image 252 is accessed to satisfy the read request. To revert, or "restore" the virtual machine to the state at the time the snapshot was taken, delta disk 1 image 254 is deleted and base disk image 252 is reopened for writes.

It is possible for more than one delta disk to be associated with a particular base disk. FIG. 2A shows delta disk 2 image 256 linked to delta disk 1 image 254 and then to base disk image 252. Together, these files represent a complete current disk image 250. Base disk image 252 and delta disk 1 image 254 represent a state of the VM's virtual disk 220 at the time of a second snapshot, and base disk image 252 represents a state of virtual disk 220 at the time of the first snapshot. In this manner, delta disk images and the base disk image may form a "disk chain" in which write accesses are always directed to the last delta disk image in the chain, i.e., delta disk 2 image 256 as shown in FIG. 2A. Base disk image 252 and delta disk 1 image 254 represent successive snapshot images of the virtual disk 220 at the time they were locked. As described in greater detail herein, the data within each delta disk image and the base disk image can be indexed by "grain directories" and "grain tables" to quickly identify the location of the most current version of data contained within a particular virtual disk sector.

As described in greater detail below, the concept of disk chains may be used to provision virtual machines and applications to users. In one embodiment, a base disk image of the disk chain includes guest OS 208. Applications, which may be virtualized application containers, are encapsulated in delta disks images chained to the base disk image. Lastly, a "user delta disk," which includes user-specific customizations and settings along with certain file system metadata, is included at the top-most layer of the disk chain.

According to some embodiments of the system described herein, a virtual desktop includes an OS (operating system) stored in an "OS store" (not shown) and one or more applications stored in an "application store" (not shown). The OS store and/or the application store may be combined into a single location or provided as separate locations in networked storage accessible by server 11. The location(s) may be what is commonly referred to as a BLOB (binary large object) store. The OS installations and applications may be selected by an administrator or other user when initially provisioning or generating a virtual desktop. Each of the OS installations or applications may be encapsulated in a separate delta disk image file, such as a VMDK file. The virtual disk image having installed OS installation and applications may be formed from a disk chain that is generated when provisioning the virtual desktop. In some embodiments, the OS installation can be divided in multiple portions, where a first portion is stored in the base disk and one or more additional portions are stored in one or more delta disks that are linked to the base disk. In this manner, patches and hot-fixes to the OS can be delivered in one of the delta disks that are linked to the base disk.

Figure 2B:
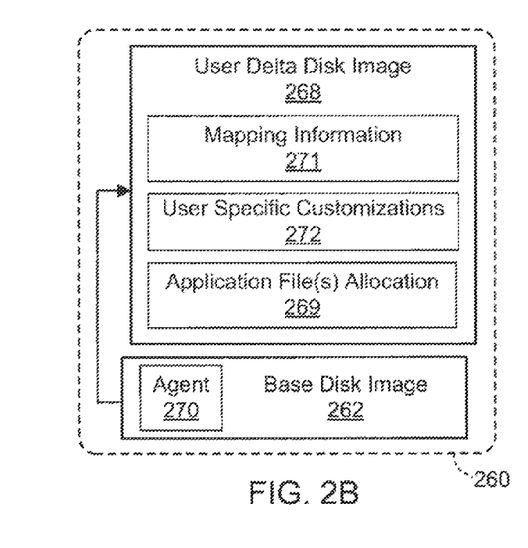
FIG. 2B is a block diagram illustrating by way of example a configuration of a virtual disk image during composition of a virtual desktop.
Figure 2C:
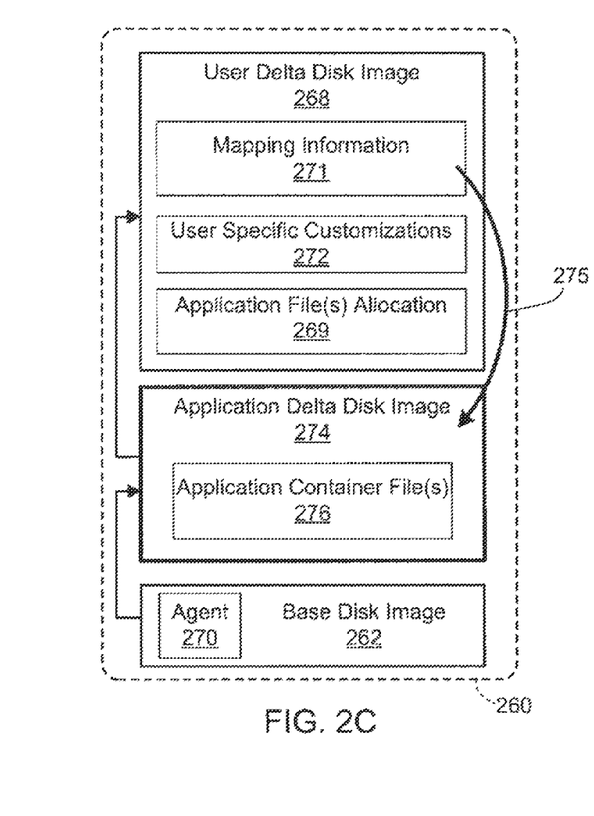
FIG. 2C is a block diagram illustrating by way of example a configuration of a virtual disk image after composition is complete

A virtual desktop management application 20 (as shown in FIG. 1A), may be configured to generate virtual desktops using the constituent VMDK files in the OS store and/or application store. FIGS. 2B and 2C show configurations of the user's virtual disk image files during provisioning and use of the virtual machine 203, respectively. To provision a new virtual desktop, the virtual desktop management application 20 and/or an administrator selects base disk 262 that includes an OS installation for the virtual desktop. The base disk 262 may also include agent 270, which is a software program that executes in the VM as shown in FIG. 1B. Agent 270 interacts with management application 20 (FIG. 1) for allocating disk blocks for application container files contained in one or more delta disks image files, as described in greater detail below. The virtual desktop management application 20 and/or an administrator may also configure user delta disk image 268 to include user-specific customizations and settings 272 for the virtual desktop. Ordinarily, the user delta disk image file 268 is initially chained to the base disk image file 262 with no intervening disks, as shown in FIG. 2B. If the OS installation is modified, e.g., patched, using additional delta disk images (not shown), user delta disk image 268 may be layered directly on top of those additional delta disk images rather than directly on the base disk image 262.

Figure 2D:
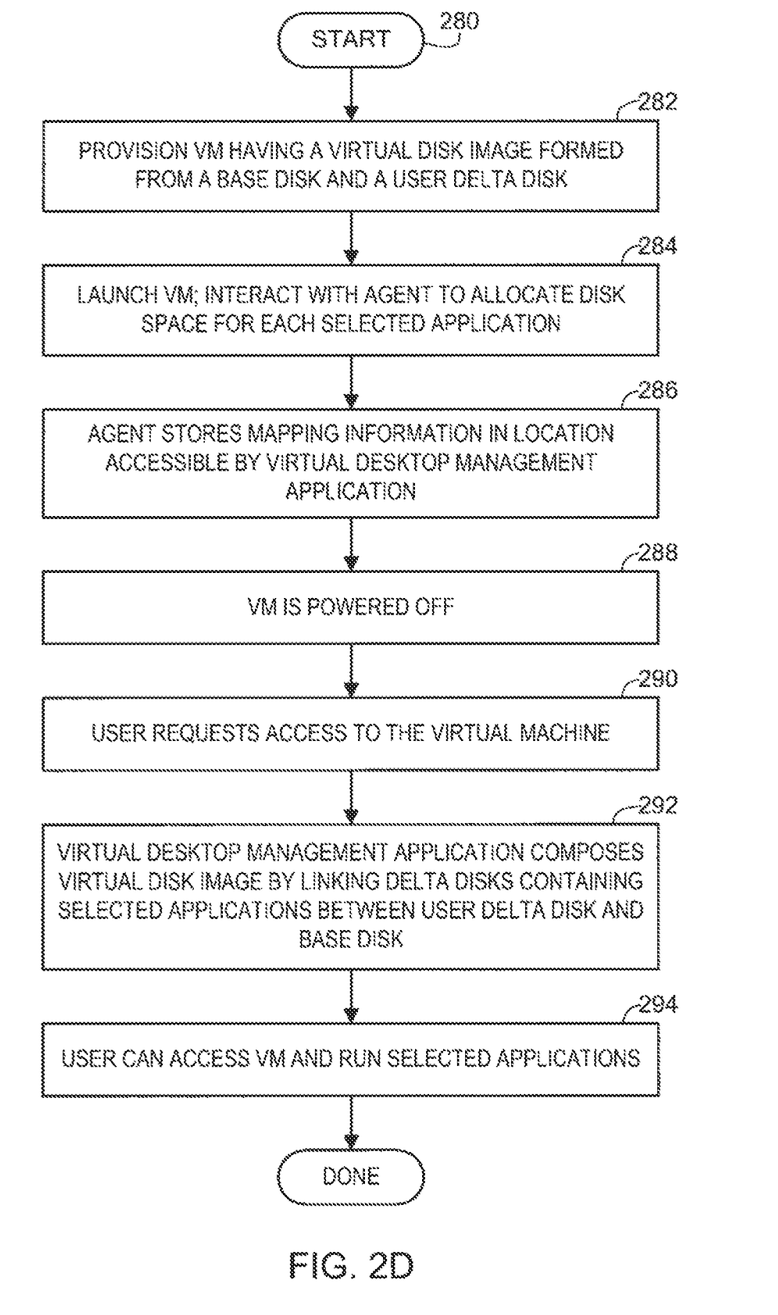
FIG. 2D is a flow diagram illustrating by way of example a method for composing a virtual disk image.

A process for composing a virtual disk image that integrates applications encapsulated into delta disk images is shown by way of example in FIG. 2D and is described below with reference to FIGS. 2B and 2C. The procedure begins as indicated by start block 280 and flows to operation 282 wherein a VM is provisioned based on a base disk image 262 and a user delta disk image 268, which is initially empty (does not contain any disk image data). To install applications into the virtual desktop, the administrator or some other entity, in operation 284, logs-in to the newly provisioned virtual machine, e.g., as shown as VM $203_A$ in FIG. 1B. If Agent 270 is not already present in base disk image 262 as shown in FIG. 2B, then agent 270 may at this time be installed on the VM, in which case it will be stored in the user delta disk image 268. The administrator, for example through interaction with virtual desktop management application 20, or directly with agent 270, can select which applications should be included in the virtual desktop. As previously described, the selected applications may be available in an "application store" (not shown) from which the administrator can select one or more applications that were previously encapsulated in delta disk image files, (e.g., VMDK files having a ".vmdk" extension). As described, in one embodiment, each application may be included in a separate application container. In other embodiments, multiple applications can be included in one application container, e.g., as an "application suite."

The virtual desktop disk image 260 includes a file system which includes metadata distributed between the base disk image 262 and the user delta disk image 268. When the administrator selects applications to install into the virtual desktop, the agent 270 calls to guest operating system 208 to create one or more files 269 of specified lengths to accommodate the applications in the application store selected by the administrator. The guest operating system 208 then allocates disk space for each of the created files 269 and creates metadata (not shown) for each file which is written to user delta disk image 268. The metadata is formed according to the particular file system provided by the guest operating system installed onto base disk image 262. For example, if Windows 7 is installed on base disk image 262, then the file system used is probably NTFS, which defines how metadata is created and written to the disk in such a way that files may be identified in a hierarchical directory tree data structure and mapped to specific file system disk blocks and corresponding disk sectors. Thus, each allocation of disk space corresponds to a list of disk block addresses and other metadata associated with the corresponding selected application file allocation. In operation 286, such mapping information 271 is obtained by agent 270 (e.g., by using APIs or system calls made available by the guest OS) and copied to a location accessible by both guest operating system 208 and virtual desktop management application 20. In one embodiment, the mapping information 271 may be stored in the top 64 MB of the virtual disk image.

Once all of the applications to be installed have been selected and the corresponding disk spaces allocated, the VM is powered-off in operation 288. At this point, none of the selected applications have been copied into the virtual desktop; the files created in operation 284 are empty. In addition, the delta disks containing the applications have not yet been "linked" in the disk chain, and the disk chain merely includes the base disk and the user's disk. However, the metadata in the user's disk provides information as to the location (disk block addresses) in which the applications "should be" located in the virtual disk image, and these locations are copied to a location (e.g., mapping information 271) that can be accessed by virtual desktop management application 20 (FIG. 1). Since user delta disk image 268 is managed so that empty disk blocks are not created within the delta disk image file until the disk block is written to, space is not allocated for the empty disk blocks (thereby conserving physical disk space), and user delta disk image 268 does not itself include the empty disk blocks.

At operation 290, the user requests access to the virtual desktop. In response to the user's request to access the virtual desktop, virtual desktop management application 20, in operation 292, reads mapping information 271 from the commonly accessible storage location, and copies this mapping information as shown by arrow 275 to application delta disk 274 so that disk blocks contained in application delta disk image 274 are accessed when the file allocated in operation 284 is accessed by the guest OS. Thus, guest OS 208 will encounter metadata in user delta disk image 268 which will then direct the user to disk blocks physically located in application delta disk image 274. In other words, application container file 276, which is encapsulated in application delta disk image 274, and is assigned disk blocks by mapping data contained within application delta disk image 274 so that block for block they correspond with block addresses of application file allocation 269 assigned by the guest OS in operation 284. File system metadata traversed by guest OS 208 that defines the disk block locations of application container file 276 are located in user delta disk image 268, even as the contents of the disk blocks are located in application delta disk image 274.

In this way, a disk chain may be composed "on-the-fly" when the user logs in to the virtual desktop. The disk chain has now been created, with a base disk image 262 that includes guest OS 208 linked to one or more application delta disks images 274 (only one shown) that each include one or more applications (only one shown), which is linked to the user's delta disk image 268 as the top-level disk in the disk chain.

During running of the virtual desktop in a VM 203 in operation 294, when guest OS 208 attempts to access data that is in stored in a chained virtual disk, hypervisor 214 satisfies the request by fetching the data from the appropriate chained delta disk image or from the base OS delta disk image (which does not necessarily include installed applications). Upon receiving a read request for data that is stored within a chained virtual disk from guest OS 208, block driver 228 in hypervisor 214, may determine the location of the requested data and its offset within the chained virtual disk in order to access the data, thus avoiding any need to add any application data to the base OS virtual disk of the virtual desktop, as previously required in prior art techniques.

FIGS. 3A-3D are conceptual diagrams that describe the implementation of a virtual disk image file format, according to one embodiment. As described above, application containers can be encapsulated in separate virtual disks, e.g., encapsulated in separate VMDK files, although use of other formats for the disk image files may be contemplated.

Figure 3A:
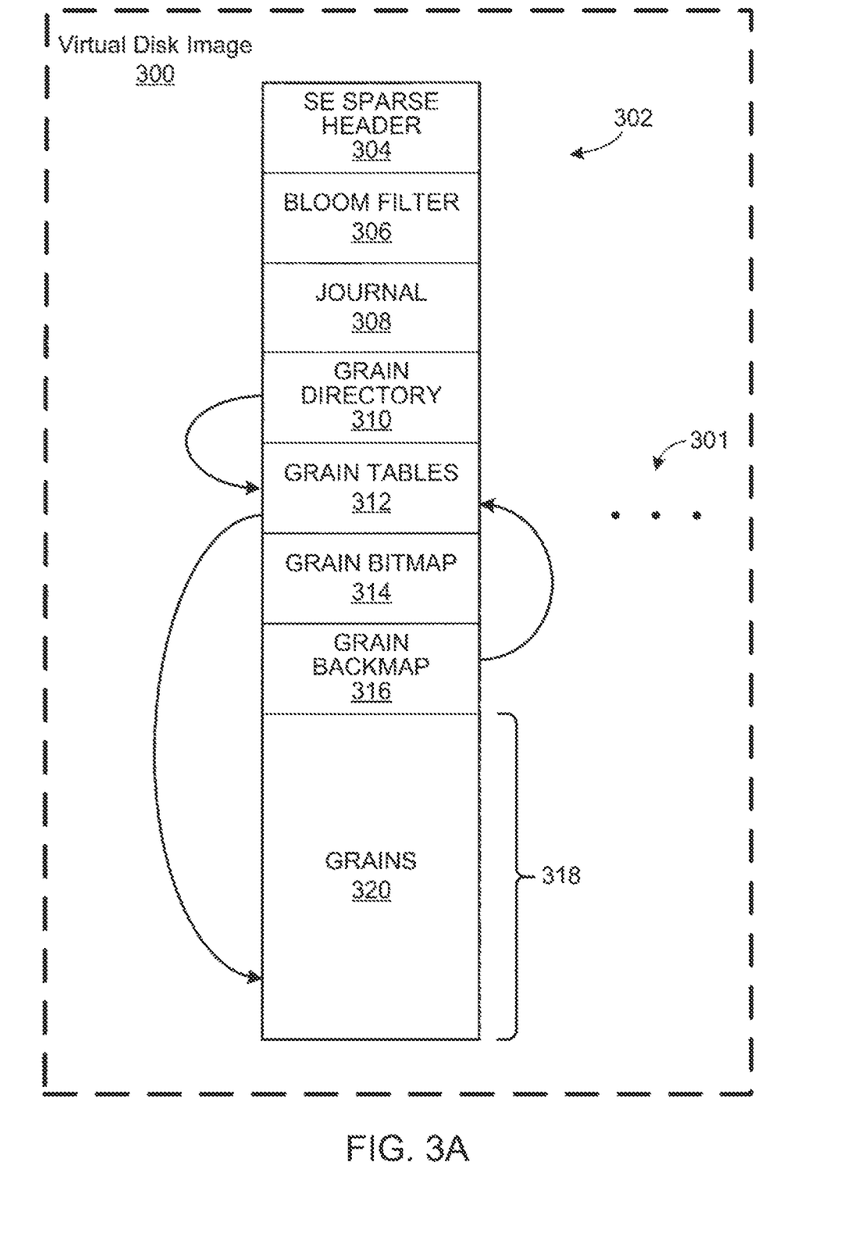
FIGS. 3A and 3B are block diagrams that illustrate by way of example a format of thinly provisioned virtual disk images.

FIG. 3A is a conceptual diagram that illustrates a virtual disk format for VMDK thinly provisioned virtual disk image 300. A region of physical storage used by virtual disk image 300 that grows over time as new data is written to the virtual disk is referred to herein as a "sparse extent" 302. Although, for exemplary purposes, the various figures and discussions herein depict virtual disk image 300 as a single file having a single sparse extent 302, it should be recognized that alternative embodiments may utilize additional files and sparse extents, as suggested by ellipses 301. Each of the base disk image and delta disk images previously described may comprise one or more sparse extents 302 that grow over time wherein each such sparse extent may reside in a separate physical file.

In the embodiment of FIG. 3A, sparse extent 302 of virtual disk image 300 includes a plurality of metadata structures that hypervisor 214 uses to manage virtual disk image 300. Sparse extent 302 includes a space-efficient sparse header 304, a bloom filter 306, and a journal 308. Sparse header 304 includes information describing configuration and settings of sparse extent 302, such as, for example, the size of a grain (e.g., 4 KBs) which, in one embodiment, may be expressed in sparse header 304 as a multiple (e.g., multiple of 8) of the size of a virtual disk sector (e.g., 512 bytes). Such a grain size may be configured by hypervisor 214 during creation of virtual disk image 300 to match the logical data block sizes utilized by the guest file system of the guest operating system 208. Bloom filter 306 is a space-efficient data structure accessed by hypervisor 214, for example, when virtual disk image 300 is associated with additional linked delta disk files. Upon receiving a file read request from the VM, hypervisor 214 may access bloom filter 306 to more efficiently assess whether the file read operation relates to data stored in the base disk (or other "higher-level" delta disks), thereby reducing I/O lookup costs of traversing multiple delta disks to make such determination (although it should be recognized that other space-efficient data structures may be utilized in alternative embodiments). Journal 308 provides a journaled metadata infrastructure for virtual disk image 300 in order to store completed "transactions" (e.g., writes to disk, etc.) prior to committing them in order to maintain and recover consistent metadata and data states in a shared file system in the event of host or storage system crashes. It should be recognized that various structures in sparse extent 302 such as bloom filter 306 and journal 308 are merely exemplary and that alternative embodiments may not necessarily include such structures. As further discussed below, sparse extent 302 also includes a grain directory 310, one or more grain tables 312, a grain bitmap 314, a grain backmap 316, and a space 318 reserved for storing one or more grains 320.

Figure 3B:
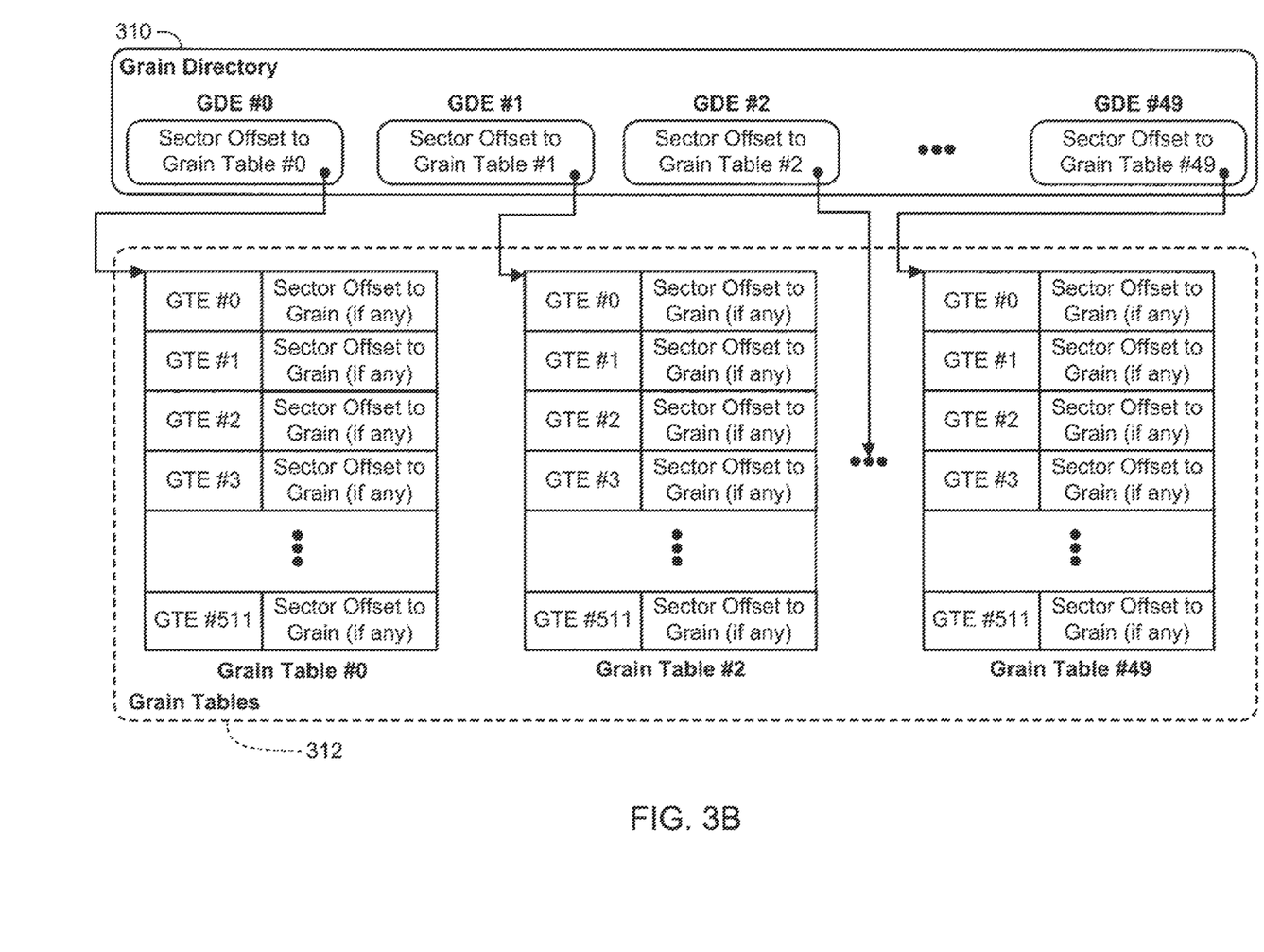

FIG. 3B is a diagram that graphically illustrates a grain directory and grain tables, according to an embodiment. When a request to access a particular logical data block of a virtual disk is made, hypervisor 214 accesses grain directory 310 and grain tables 312 to determine which grain (if any) in space 318 corresponds to the requested logical date block. Grain directory 310 subdivides the logical data blocks available in a virtual disk (e.g., in sparse extent 302) such that each grain directory entry (GDE) represents a contiguous portion of logical data blocks of virtual disk image 300. In particular, each GDE itself comprises a reference (e.g., an offset in sectors in the virtual disk) to one of grain tables 312. Each entry in a grain table, referred to as a grain table entry (GTE), also comprises a reference (e.g., an offset in sectors in the virtual disk) to a grain allocated in space 318. In the embodiment of FIG. 3B, for example, each grain table 312 comprises 512 GTEs and each GTE references a grain, of 4 KBs (i.e., one logical data block in the guest file system) such that each GDE provides access to a 2 MB portion of contiguous logical data blocks available in virtual disk 300 (i.e., number of entries (512)*grain size (4 KB)=2 MBs).

If, in such an embodiment, sparse extent 302 was initially created to provide virtual disk image 300 with 100 MBs of storage space, then grain directory 310 is initialized to include 50 GDEs (i.e., 100 MBs/2 MBs). In such an embodiment, hypervisor 214 can traverse grain directory 310 and grain tables 312 to determine a grain in sparse extent 302 that corresponds to, for example, logical data block 50 in the 100 MBs of virtual disk 300. Specifically, hypervisor 214 determines that the first GDE of grain directory 310, namely, GDE 0, references the appropriate grain table by calculating the following: 50th logical data block of 100 MBs of data % (modulus operator) 512 logical data blocks accessible per GDE=0$^{th}$ GDE. Hypervisor 214 then accesses the grain table referenced in GDE 0 and determines that the 50th GTE of the referenced grain table should contain a reference to a grain in space 318 that corresponds to the 50th logical data block of virtual disk 300 (i.e., by calculating the following: 50th logical data block of 100 MBs of data % 512 contiguous logical data blocks accessible in GDE 0)=50th GTE). Furthermore, if the value of the 50th GTE is 0 (or any other similar unique identifier), then a grain has not yet been allocated for the 50th logical data block of the 100 MBs of available data hi sparse extent 302 for virtual disk 300 (e.g., and hypervisor 512 can allocate a grain in space 318 at that time, if needed, such as for a write operation to the 50th logical data block).

As such, it should fee recognized that when sparse extent 302 is initially created in such an embodiment, all grain tables are initialized to 0 (or any other similar unique identifier) meaning that a grain has not yet been allocated to any logical, data blocks of virtual disk 300 and once a grain is allocated from space 318, the corresponding grain table entry is set with an offset of sectors to the grain in sparse extent 302. It should further be recognized that alternative embodiments may not necessarily utilize a grain directory to provide an initial subdivision of the storage space available in sparse extent 302 but rather rely solely on grain tables (which may have entries of arbitrary size, versus a fixed length of 512 entries as discussed herein).

In some embodiments, some GDEs may have SPARSE/NULL entries and may not hold a valid grain table pointer. In addition. It should be recognized that the GDEs of grain directory 310 may not necessarily point to grain tables having monotonically increasing grain table numbers.

As discussed above, because virtual disk image 300 is created with "sparse" extent 302, it is thinly provisioned such that grains are not initially allocated to the virtual disk image file (e.g., .vmdk file) during initial creation but are allocated only when additional storage space is needed by the virtual disk image. In one embodiment, grain tables 312 may be further configured to reduce or eliminate storage of "zero blocks" (i.e., data blocks having no data) in virtual disk 300. Guest operating system 208 may request a zero block, for example, by requesting that a logical data block be zeroed out (i.e., zeroes written into the data block) for security purposes, prior to re-allocating the data block to a file in virtual disk image 300. In such an embodiment, instead of allocating a grain that will store only zeroes for the logical data block, hypervisor 214 may alternatively store, within the GTE corresponding to the logical data block, a specific value or identifier representing the zero block (referred to as a "sentinel" value). When guest operating system 208 requests a read operation on the logical data block, hypervisor 214 looks up the GTE corresponding to fee logical data block, recognizes the sentinel value stored in the GTE and accordingly, returns zero block data to guest operating system 208. As such, less disk storage is used by not having to actually store the zero blocks.

The sentinel value may be a predetermined unique value stored in a grain table entry 404 and reserved for use by the hypervisor 214, although it should be recognized that the sentinel value may be implemented in a variety of alternative ways. Referring again to FIG. 3A, grain bitmap 314 tracks usage of grains in sparse extent 302 and enables hypervisor 214 to selectively choose particular grains when hypervisor 214 needs to allocate a grain for a logical data block of virtual disk image 300. Grain bitmap 314 includes a plurality of bitmap entries, wherein each bitmap entry corresponds to a grain that is mappable in sparse extent 302, regardless of whether physical storage space has actually been allocated for such a grain. In one embodiment, each bitmap entry provides an identification of an available grain in space 318 and an indication as to whether the corresponding grain: (i) is currently being used to store data, (ii) is currently unused but has been previously allocated (e.g., was used to store data at some point but is no longer in used), or (iii) has not been allocated (e.g., has not been used by the virtual disk or has been de-allocated as further discussed below).

It should be recognized that although grain bitmap 314 has been referred to as a "bitmap," such a term should be construed broadly to mean any data structure that can maintain information regarding each grain in space 318. Furthermore, alternative embodiments may utilize grain bitmaps that track less or more information relating to grains in space 318 depending upon the levels of space efficiency desired in such embodiments. In one such alternative embodiment, each bitmap entry of grain bitmap 314 provides an identification of an available grain in space 318 and an indication as to whether the corresponding grain: (i) is currently being used to store data, or (ii) is not used (regardless of whether it has been allocated or not). The information as to whether a grain is currently unused but previously allocated may be derived by checking if the grain has a sector offset that is less than the current file length.

Grain backmap 316 enables hypervisor 214 to identify a GTE corresponding to a particular grain in space 318. Grain backmap 316 may be used by hypervisor 214 when defragmenting virtual disk image 300 by collocating unused grains towards the end of the virtual disk so that a truncation (e.g., unmap commands issued by hypervisor 214 to the remote storage system) of the virtual disk image may reclaim physical storage space. In one embodiment, grain backmap 316 comprises a plurality of backmap entries corresponding to each grain in space 318 that is currently in use by the guest file system (e.g., grains in space 318 that are allocated but unused may not have a backmap entry.

Figure 4:
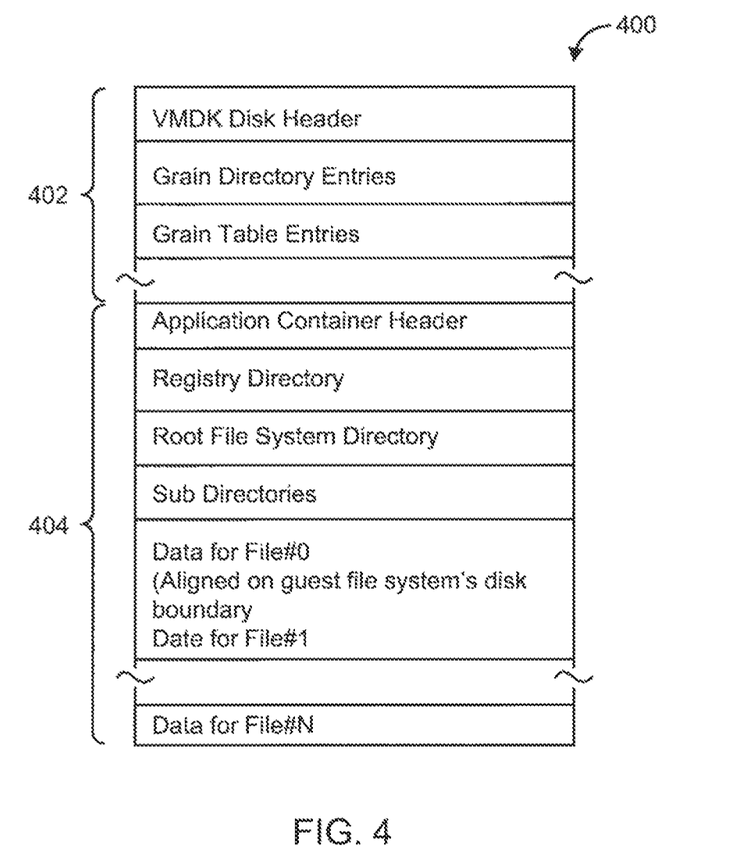
FIG. 4 is a conceptual diagram illustrating by way of example a delta disk image file format including a virtualized application container file.

FIG. 4 shows, by way of example, an application delta disk image 400 which includes a containerized virtualized application file 404.

The virtualized application file 404 may be implemented using a single logical file that resides in application delta disk image 400 and acts as a container file that includes all the files and registry entries associated with a particular application installation, as described above. As described above, in some examples, an application virtualization system (e.g., the ThinApp™ program provided by VMware, Inc.) can be used to generate containerized virtualized application file 404. A separate utility may be used to generate the application delta disk image 400 from the application container 404. For example, a utility may take the result of the application containerization (application virtualization), i.e., the virtualized application file, and one or more file system parameters as input, and generate application delta disk image 400 that includes the virtualized application file 404 as the data payload.

In the example shown in FIG. 4, a VMDK disk header, grain directory entries (GDEs), and grain table entries comprise the metadata 402 of the virtual disk 400. Metadata 402 cannot be accessed by the guest. As also shown, application container file 404 includes an application container header, registry directory, root file system directory, sub directories, and data. Although illustrated as a contiguous file within application delta disk image 400, virtualized application file 404 is actually formed of a plurality of logical blocks that are addressed by grain directory and grain tables within metadata 402 and individually addressed grains in grain space 318 (FIG. 3A).

Figure 5:
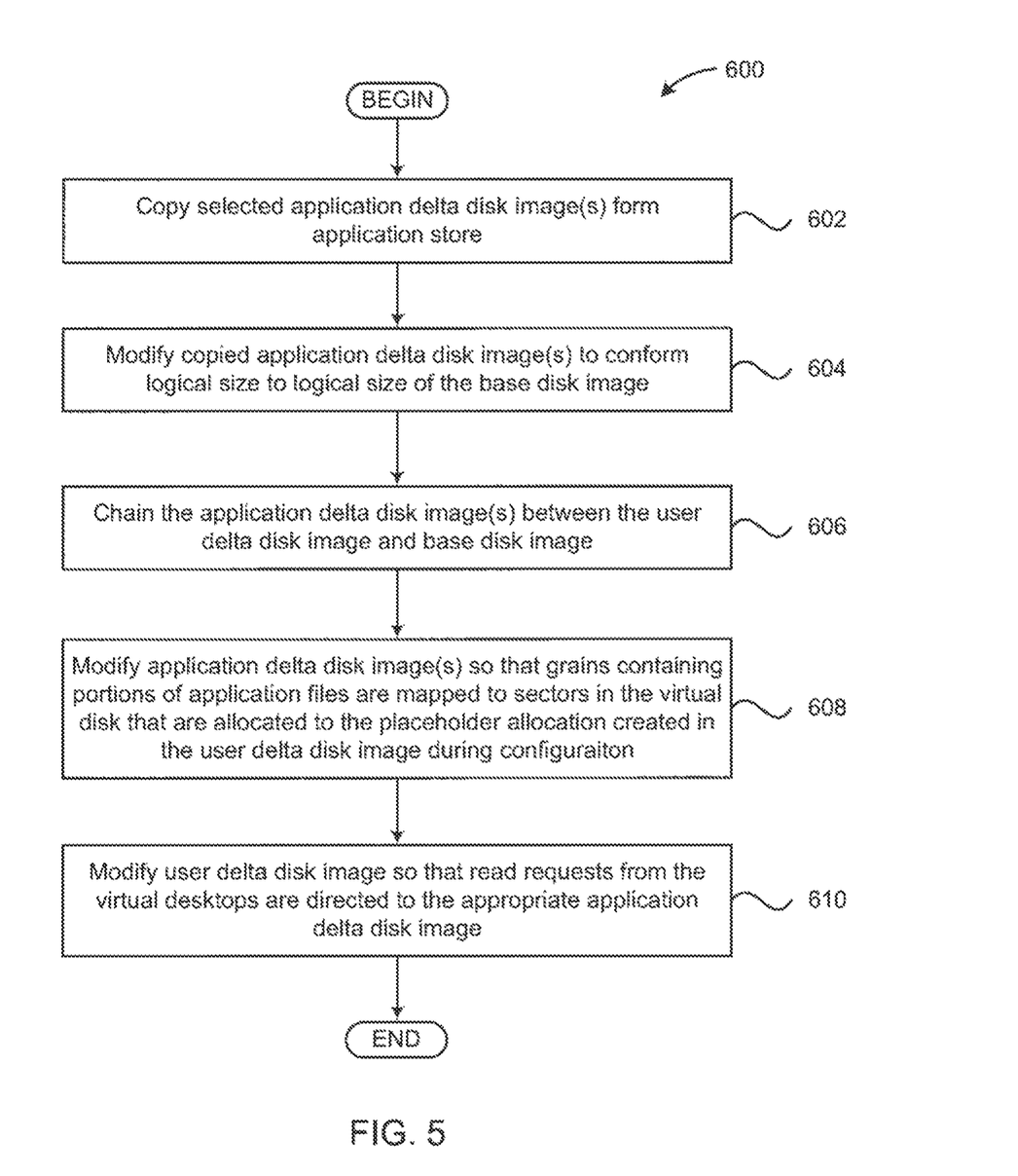
FIG. 5 is a flow diagram illustrating by way of example a method of recomposing a virtual disk image to include intermediate application delta disk images.

FIG. 5 is a flow diagram of exemplary operations of method 600 for composing a virtual disk image. In one embodiment, the method described herein with reference to FIG. 5 may be implemented by virtual desktop management application 20 (FIG. 1) at the time a user first logs into his or her VM after his or her virtual desktop is configured (or reconfigured) by a desktop administrator. For example, the composing operation 292 shown in FIG. 2C may be carried out according to the steps described here with reference to FIG. 5. In other embodiments, the composing step may be carried out automatically immediately after the configuring operations 282-288 of FIG. 2C.

As shown, method 600 begins at step 602, in which virtual desktop management application 20 (FIG. 1) either in response to a user logging into his or her virtual desktop for the first time after configuration or in response to a trigger by agent 270, identifies selected application delta disk images and copies them from the application store. Information that identifies which of the application delta disk images were selected by the desktop administrator during configuration (along with corresponding mapping information) may be obtained from a preconfigured location accessible by the virtual desktop management application, i.e., the location previously described with reference to operation 286 in FIG. 2D. The selected application delta disk images are copied to a location, e.g., a file, directory, or folder, that is associated with the particular user's virtual desktop. Each copied application delta disk image is associated only with one virtual desktop, although one virtual desktop may have multiple application delta disk images, as previously explained.

At step 604, virtual desktop management application modifies (enlarges, typically) the logical size of the application delta disk image to conform with the logical size of the base virtual disk image. Generally, virtual disk images that are layered onto another virtual disk image in a disk chain are required to have the same logical size. In one embodiment, the logical size of an application delta disk image corresponding to a particular application is created smaller than the typical logical size of the base virtual disk image associated with the virtual machine. Therefore, the logical size of the application delta disks image is enlarged to match the size of the base virtual disk image. In one embodiment, the size the application delta disk image is enlarged by updating metadata 402 (FIG. 4) for the application delta disk image to reflect the enlarged size, an operation that is relatively fast and does not necessarily consume any or significant additional physical disk space.

At step 606, when the VM is re-started, the virtual desktop management application 20 modifies the application delta disk image(s) and the user delta disk image so they are chained to the base disk image with the application delta disk image(s) being positioned in the disk chain between the base disk image and the user delta disk image, as shown in FIG. 2C. Each sparse extent contains linking information mat identifies a parent virtual disk image for that link in the chain. This information is updated so that the application delta disk image(s) each depend on the parent, or base disk image or another application delta disk image. Each delta disk image in the chain has a single parent and are arranged in a chain so that each has either only one other application delta disk image or the user delta disk image as an immediate child delta disk image. The base disk image, in contrast, may be shared by a large number of child delta disk images each of which reference the base disk image.

When a user logs-on to the virtual desktop, a full-feature OS and one or more full-feature applications are available to the user, as if the OS and applications are actually installed on the base virtual disk.

Since the applications are not actually copied to the base virtual disk, the base virtual disk can be small in size, relative to prior art techniques. For example, in conventional desktop virtualization techniques, as more applications are installed on the individual virtual desktops, there would be duplication of data due to multiple copies of applications installed on different desktops. This results in relatively high disk usage. According to embodiments described herein, the disk requirements provided are lower compared to prior art techniques since a single copy of the data blocks associated with an application is maintained in application containers, instead of a separate copy in each virtual disk, thereby providing data de-duplication.

Additionally, since each user/VM may select different applications for installation in the virtual desktop, and since the virtual disks for the applications can be chained in a different order for each user/VM, in one embodiment, the virtual desktop management application generates separate layering and configuration information for each virtual disk.

Techniques described herein provide for dynamically composing a virtual desktop that provides a user access to one or more applications in a virtualized computing environment. According to this technique, an operating system for the virtual desktop is stored in a base virtual disk and one or more applications for the virtual desktop are stored in application containers that are encapsulated in separate virtual disks. The virtual disks that include the encapsulated application containers are linked to the base virtual disk in a disk chain. The hypervisor receives data block requests from a virtual desktop to access data. When the data block is stored in the base virtual disk, the hypervisor causes the data block to be accessed from the base virtual disk, and when the data block is stored in an application container virtual disk chained to the base virtual disk, the hypervisor causes the data block to be accessed from the application container virtual disk.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computers. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The visualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of embodiments described herein. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for composing a virtual disk for a virtual machine, the virtual disk comprising a base virtual disk image, a user delta disk image, and one or more application delta disk images, the method comprising:
   identifying an application delta disk image in an application store, the application delta disk image having an application stored therein, wherein the identifying of the application delta disk image comprises analyzing metadata that has been stored in the user delta disk image;
   copying the identified application delta disk image to a location that is accessible to a virtual desktop of the virtual machine;
   modifying a logical size of the copied application delta disk image to conform with a logical size of the base virtual disk image of the virtual machine;
   linking the base virtual disk image, the application delta disk image, and the user delta disk image; and
   modifying the user delta disk image so that read requests from the virtual desktop directed to the virtual disk are satisfied with data from the application delta disk image.

2. The method of claim 1, wherein the identifying of the application delta disk image is performed in response to receiving a login request to the virtual desktop.

3. The method of claim 1, wherein the metadata stored in the user delta disk image indicates a location of disk space allocated in the virtual disk at which the application stored in the application delta disk image is to be accessed.

4. The method of claim 3, wherein modifying the user delta disk image comprises modifying the metadata stored in the user delta disk so that one or more files associated with the application are mapped to the disk space allocated in the virtual disk.

5. The method of claim 4, wherein the allocating of disk space is carried out by an agent application installed on the virtual desktop that operates in conjunction with a virtual desktop management application executing outside of the virtual desktop.

6. The method of claim 1, wherein modifying the logical size of the copied application delta disk image comprises updating metadata of the application delta disk image.

7. A system for composing a virtual disk for a virtual machine, the virtual disk comprising a base virtual disk image, a user delta disk image, and one or more application delta disk images, and the system including at least one physical processor for executing software instructions that reside in a system memory of the system, where the software instructions implement a method comprising:
   identifying an application delta disk image in an application store, the application delta disk image having an application stored therein, wherein the identifying of the application delta disk image comprises analyzing metadata that has been stored in the user delta disk image;
   copying the identified application delta disk image to a location that is accessible to a virtual desktop of the virtual machine;
   modifying a logical size of the copied application delta disk image to conform with a logical size of the base virtual disk image of the virtual machine;
   linking the base virtual disk image, the application delta disk image, and the user delta disk image; and
   modifying the user delta disk image so that read requests from the virtual desktop directed to the virtual disk are satisfied with data from the application delta disk image.

8. The system of claim 7, wherein the identifying of the application delta disk image is performed in response to receiving a login request to the virtual desktop.

9. The system of claim 7, wherein the metadata stored in the user delta disk image indicates a location of disk space allocated in the virtual disk at which the application stored in the application delta disk image is to be accessed.

10. The system of claim 9, wherein modifying the user delta disk image comprises modifying the metadata stored in the user delta disk so that one or more files associated with the application are mapped to the disk space allocated in the virtual disk.

11. The system of claim 10, wherein the allocating of disk space is carried out by an agent application installed on the virtual desktop that operates in conjunction with a virtual desktop management application executing outside of the virtual desktop.

12. The system of claim 7, wherein modifying the logical size of the copied application delta disk image comprises updating metadata of the application delta disk image.

13. A non-transitory computer-readable medium storing computer instructions that, when executed, cause a computer system to implement a method for composing a virtual disk, the method comprising:
   identifying an application delta disk image in an application store, the application delta disk image having an application stored therein, wherein the identifying of the application delta disk image comprises analyzing metadata that has been stored in the user delta disk image;

copying the identified application delta disk image to a location that is accessible to a virtual desktop of the virtual machine;

modifying a logical size of the copied application delta disk image to conform with a logical size of the base virtual disk image of the virtual machine;

linking the base virtual disk image, the application delta disk image, and the user delta disk image; and modifying the user delta disk image so that read requests from the virtual desktop directed to the virtual disk are satisfied with data from the application delta disk image.

14. The computer-readable medium of claim 13, wherein the identifying of the application delta disk image is performed in response to receiving a login request to the virtual desktop.

15. The computer-readable medium of claim 13, wherein the metadata stored in the user delta disk image indicates a location of disk space allocated in the virtual disk at which the application stored in the application delta disk image is to be accessed.

16. The computer-readable medium of claim 15, wherein modifying the user delta disk image comprises modifying the metadata stored in the user delta disk so that one or more files associated with the application are mapped to the disk space allocated in the virtual disk.

17. The computer-readable medium of claim 16, wherein the allocating of disk space is carried out by an agent application installed on the virtual desktop that operates in conjunction with a virtual desktop management application executing outside of the virtual desktop.

* * * * *